United States Patent
LaPlant et al.

(10) Patent No.: US 11,872,749 B2
(45) Date of Patent: Jan. 16, 2024

(54) SYSTEM AND METHOD FOR ADDITIVELY MANUFACTURING POROUS PARTS VIA SALT MICRO-SPHERES

(71) Applicant: HONEYWELL FEDERAL MANUFACTURING & TECHNOLOGIES, LLC, Kansas City, MO (US)

(72) Inventors: Steven Todd LaPlant, Kansas City, MO (US); Michael Joseph Batrick, Kansas City, MO (US); Ruben Arturo Pino, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 116 days.

(21) Appl. No.: 17/732,821

(22) Filed: Apr. 29, 2022

(65) Prior Publication Data

US 2022/0258415 A1    Aug. 18, 2022

Related U.S. Application Data

(62) Division of application No. 16/677,865, filed on Nov. 8, 2019, now abandoned.

(51) Int. Cl.
| | |
|---|---|
| *B29C 67/00* | (2017.01) |
| *B29C 64/165* | (2017.01) |
| *B29C 64/245* | (2017.01) |
| *B29C 64/205* | (2017.01) |
| *B29C 64/314* | (2017.01) |
| *B29C 64/35* | (2017.01) |
| *B33Y 40/00* | (2020.01) |
| *B29K 105/04* | (2006.01) |

(Continued)

(52) U.S. Cl.
CPC .......... *B29C 64/165* (2017.08); *B29C 64/205* (2017.08); *B29C 64/245* (2017.08); *B29C 64/314* (2017.08); *B29C 64/35* (2017.08); *B29K 2105/041* (2013.01); *B33Y 10/00* (2014.12); *B33Y 30/00* (2014.12); *B33Y 40/00* (2014.12)

(58) Field of Classification Search
CPC ..... B29C 64/35; B29C 64/165; B29C 64/205; B29C 64/245; B29C 64/314; B33Y 10/00; B33Y 30/00; B33Y 40/00; B33Y 50/00; B33Y 50/02; B29K 2105/041
See application file for complete search history.

(56) References Cited

U.S. PATENT DOCUMENTS

| | | |
|---|---|---|
| 4,859,712 A | 8/1989 | Cox |
| 4,889,744 A | 12/1989 | Quaid |

(Continued)

FOREIGN PATENT DOCUMENTS

| | | | | |
|---|---|---|---|---|
| WO | WO-2015015151 A1 * | 2/2015 | ............. | A23L 27/40 |
| WO | WO-2017062031 A1 * | 4/2017 | ........... | B29C 64/153 |

*Primary Examiner* — Ryan M Ochylski
(74) *Attorney, Agent, or Firm* — Hovey Williams LLP

(57) ABSTRACT

A system and method of additively manufacturing a part via salt micro-spheres. The method includes mixing salt micro-spheres with an additive manufacturing material to form an additive manufacturing material mixture. The additive manufacturing material mixture is deposited on a build platform layer by layer and cured so as to create a structure having pores formed by the salt micro-spheres. The salt micro-spheres may then be dissolved and flushed from the pores.

20 Claims, 5 Drawing Sheets

(51) Int. Cl.
    *B33Y 10/00*           (2015.01)
    *B33Y 30/00*           (2015.01)

(56) References Cited

U.S. PATENT DOCUMENTS

| | | |
|---|---|---|
| 5,605,693 A | 2/1997 | Seare, Jr. |
| 6,900,055 B1 | 5/2005 | Fuller et al. |
| 7,488,773 B2 | 2/2009 | Pause |
| 8,129,020 B2 | 3/2012 | Masuda et al. |
| 8,182,921 B2 | 5/2012 | Weidinger |
| 8,227,520 B2 | 7/2012 | Shirasaki et al. |
| 8,487,012 B2 | 7/2013 | Goraltchouk et al. |
| 2003/0114936 A1* | 6/2003 | Sherwood ............. B29C 64/165 435/402 |
| 2004/0038009 A1 | 2/2004 | Leyden et al. |
| 2011/0129924 A1 | 6/2011 | Ying et al. |
| 2018/0086002 A1* | 3/2018 | Sun .................. B29C 64/00 |
| 2021/0284830 A1* | 9/2021 | Doris ................ C23C 18/1644 |

\* cited by examiner

SYSTEM AND METHOD FOR ADDITIVELY MANUFACTURING POROUS PARTS VIA SALT MICRO-SPHERES

RELATED APPLICATIONS

The present patent application is a divisional patent application claiming priority benefit, with regard to all common subject matter, to U.S. patent application Ser. No. 16/677,865, entitled "SYSTEM AND METHOD FOR ADDITIVELY MANUFACTURING POROUS PARTS VIA SALT MICRO-SPHERES", filed Nov. 8, 2019. The earlier-filed patent application is hereby incorporated by reference in its entirety into the present application.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Pores are often added to silicone foams to improve various characteristics of the foams. One method of doing so is via gaseous chemical reactions, but this method is unpredictable and not very repeatable. Urea can also be used as a pore former, but its low melt point makes curing the silicone difficult. For example, the silicone may lose its shape during Urea washout since the silicone may not be fully cured.

SUMMARY OF THE INVENTION

Embodiments of the present invention solve the above-mentioned problems and other problems and provide a distinct advance in the art of manufacturing porous parts. More particularly, the present invention provides a system and method for additively manufacturing porous parts via salt micro-spheres.

One embodiment of the invention is an additive manufacturing system including a build platform, a material deposition device, and a cure device. The additive manufacturing system utilizes an additive manufacturing mixture including an additive manufacturing material and salt micro-spheres.

The additive manufacturing material may be a plastic, polymer, or organic material suitable for use in additive manufacturing and may be in pellet or powder form or any other suitable form. For example, the additive manufacturing material may be a silicone material such as HVM/LVM rubber gum or direct-write inks of various durometers. The additive manufacturing material may also be acrylonitrile butadiene styrene (ABS), polyamide, straw-based plastic, or other similar material.

The salt micro-spheres are small, dissolvable, spherical salt crystals that do not have a conventional crystalline shape. In one embodiment, the salt micro-spheres are hollow.

The build platform may be a stationary or movable flat tray or bed, a substrate, a print plate, a shaped mandrel, a wheel, scaffolding, or similar support. The build platform may be integral with the additive manufacturing system or may be removable and transferable with the part as the part is being constructed.

The material deposition device may include a nozzle, guide, sprayer, or other similar component. The material deposition device may be configured to deposit material via direct ink writing (DIW) at room temperature for subsequent curing. In one embodiment, the material mixture deposition device is configured to extrude strands of additive manufacturing material mixture for creating a lattice structure.

The cure device is a heating device or system for curing the part after material deposition is complete. To that end, the cure device may be an oven, a furnace, a heating element, or any other suitable heating device.

In use, the build platform supports the part as it is being constructed. The material deposition device deposits the additive manufacturing material mixture onto the build platform and onto previously constructed layers via DIW or a similar technique. The cure device cures the additive manufacturing material so as to create a structure having pores formed by the salt micro-spheres.

Another embodiment of the invention is an additive manufacturing system including an additive manufacturing material reserve, a salt micro-sphere reserve, a sieve, a mixing device, a feeder, a material mixture deposition device, a cure device, and a flushing system.

The additive manufacturing material reserve may be a hopper, tank, cartridge, container, spool, or other similar material holder for retaining additive manufacturing material. The additive manufacturing material reserve may be integral with the additive manufacturing system or may be disposable and/or reusable.

The salt micro-sphere reserve may be a hopper, tank, cartridge, container, or other similar holder for retaining salt micro-spheres. The salt micro-sphere reserve may be integral with the additive manufacturing system or may be disposable and/or reusable.

The sieve includes a filter or series of filters for sorting salt micro-spheres by size. For example, the sieve may include a first filter including holes having a diameter substantially equal to the largest desired diameter of salt micro-spheres. A second filter in series with the first filter may include holes having a diameter substantially equal to the smallest desired diameter of salt micro-spheres such that salt micro-spheres that pass through the first filter but do not pass through the second filter (and hence have diameters within a desired range) can be used in the additive manufacturing system. In one embodiment, the salt micro-spheres may be filtered to have diameters of between 20 micrometers and 100 micrometers. The sieve may be used or connected upstream or downstream of the salt micro-sphere reserve.

The mixing device is connected downstream of the additive manufacturing material reserve and the salt micro-sphere reserve (and optionally downstream of the sieve) and upstream of the feeder. The mixing device combines, via continuous inline mixing, batch mixing, or the like, the optionally filtered salt micro-spheres with the additive manufacturing material to form a homogenous additive manufacturing material mixture. The mixing device may be a mechanical mixer, a planetary mixer, a resonance acoustic mixer, or any other suitable mixer.

The feeder is connected downstream of the mixing device and directs the additive manufacturing material to the material mixture deposition device. The feeder may be a pump, an auger, or any other suitable feeder. Alternatively, the additive manufacturing material may be gravity fed to the material mixture deposition device.

The material mixture deposition device may include a nozzle, guide, sprayer, or other similar component for depositing the additive manufacturing material mixture onto a build platform, print plate, shaped mandrel, or the like, of the additive manufacturing system and previously constructed layers. In one embodiment, the material mixture deposition device prints strands of additive manufacturing material mixture to create a lattice structure.

The cure device is a heating device or system for curing the part after deposition is complete. To that end, the cure device may be an oven, a furnace, a heating element, or any other suitable heating device.

The flushing system is configured to dispense warm or hot water for dissolving the salt micro-spheres, thus leaving pores in the structure. To that end, the flushing system may be a water bath, a tank, or any other suitable device.

The additive manufacturing system may be any type of additive manufacturing or "3D printing" system such as a sintering, laser melting, laser sintering, DIW, extruding, fusing, stereolithography, light polymerizing, powder bed, wire additive, or laminated object manufacturing system. The additive manufacturing system may also be a hybrid system that combines additive manufacturing with molding, scaffolding, and/or other subtractive manufacturing or assembly techniques.

In use, the sieve filters the salt micro-spheres so that only salt micro-spheres having diameters within a desired range are used. The mixing device mixes the additive manufacturing material and the salt micro-spheres to create an additive manufacturing material mixture. The feeder then feeds the additive manufacturing material mixture to the material mixture deposition device, which in turn deposits the additive manufacturing material mixture onto a build platform, print plate, shaped mandrel, or the like, and onto previously constructed layers. The cure device then cures the additive manufacturing material so as to create a structure having pores formed by the salt micro-spheres. The flushing system then dissolves the salt micro-spheres and removes them from the pores.

Another embodiment of the invention is a method of additive manufacturing a part using salt micro-spheres as pore formers. First, additive manufacturing material is positioned in an additive manufacturing material reserve and salt micro-spheres are positioned in a salt micro-sphere reserve of an additive manufacturing system.

The salt micro-spheres are then filtered through a sieve so that only salt micro-spheres having diameters within a desired range are used. Alternatively, the salt micro-spheres may be pre-sieved. Depending on the part being made or the part's intended application, it may be desirable for the salt micro-spheres to be unfiltered for size.

The salt micro-spheres and additive manufacturing material are then mixed together via a mixing device to create an additive manufacturing material mixture. The salt micro-spheres and additive manufacturing material may be mixed according to a desired ratio. In one embodiment, the ratio may be chosen such that pores created by the salt micro-spheres account for a certain amount, such as at least fifty percent, of an effective volume of a structure of the part. This ratio allows the salt micro-spheres to be flushable from the pores and not embedded in the additive manufacturing material.

The additive manufacturing material mixture is then fed to the material mixture deposition device via the feeder. The additive manufacturing material mixture may be metered in discrete amounts or continuously, depending on movement and position of the material mixture deposition device.

The material mixture deposition device then deposits the additive manufacturing material mixture onto a build platform, print plate, shaped mandrel, or the like, of the additive manufacturing system and onto previously constructed layers via DIW or a similar technique. The specific location and placement of the additive manufacturing material mixture may be according to computer-aided design (CAD) data, or other technical model or drawing, as followed manually or by a user or as directed in an automated or semi-automated fashion via control signals provided from a processor to motors of the additive manufacturing system. In one embodiment, the additive manufacturing material mixture is extruded as strands so that the resulting structure is a lattice structure having several voids.

Once a layer has been deposited, another layer of additive manufacturing material mixture may be deposited on top of the previously-deposited layer. This may be accomplished through first lowering the build platform relative to the material mixture deposition device.

The cure device then cures the additive manufacturing material. To that end, the structure (and optionally a build plate, print plate, mandrel, or the like on which the structure has been created) may be placed in the cure device. The cure device may heat the structure so as to crosslink polymer chains of the additive manufacturing material.

The flushing system then dissolves the salt micro-spheres and flushes the resulting saline solution from the pores. In one embodiment, the structure is submerged in warm or hot water and may be agitated to ensure complete dissolution, thus leaving the porous structure.

The above-described steps may be performed in any order, including simultaneously. In addition, some of the steps may be repeated, duplicated, and/or omitted without departing from the scope of the present invention.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
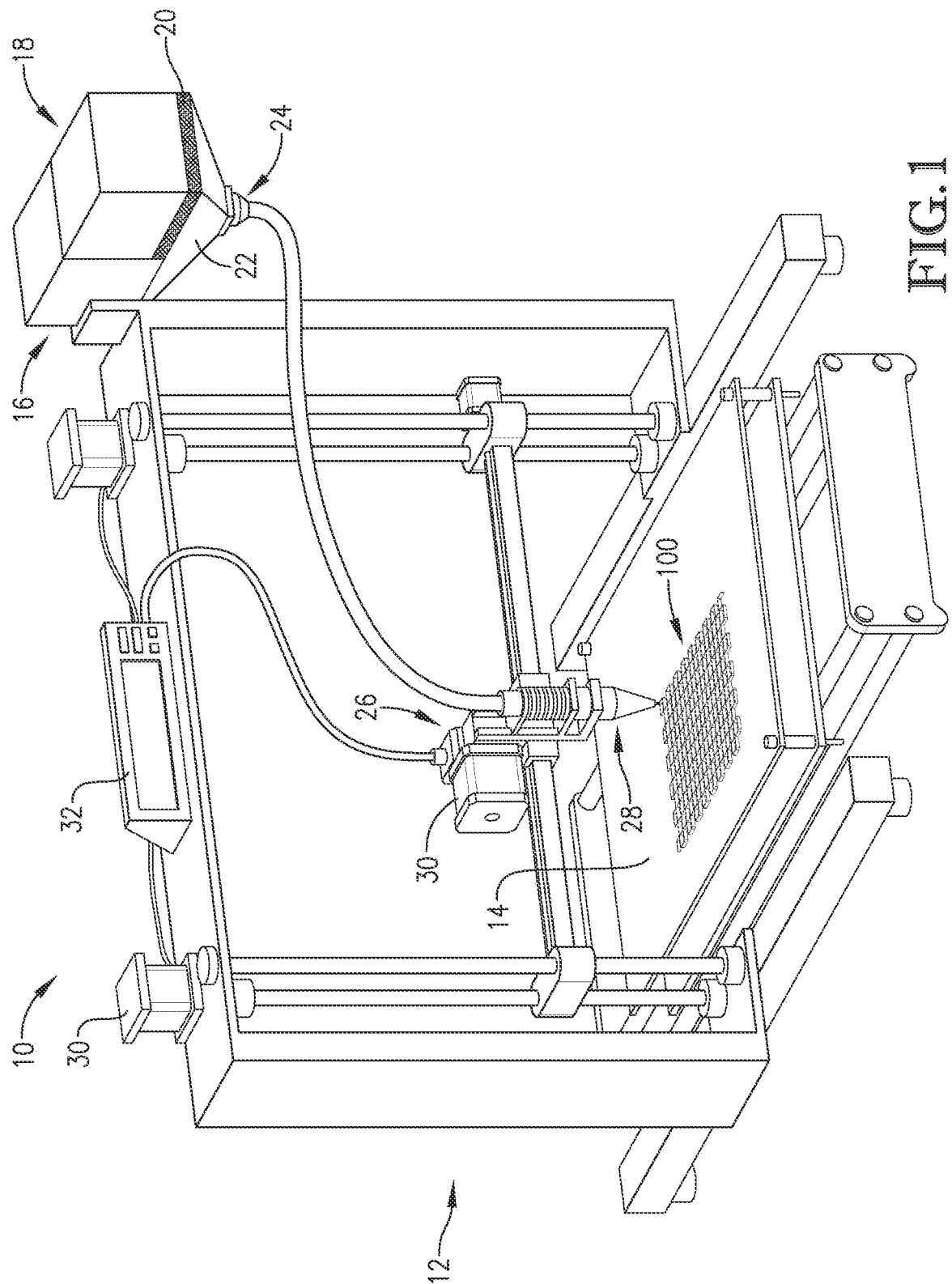
FIG. 1 is a perspective view of an additive manufacturing system constructed in accordance with an embodiment of the invention.
Figure 2:
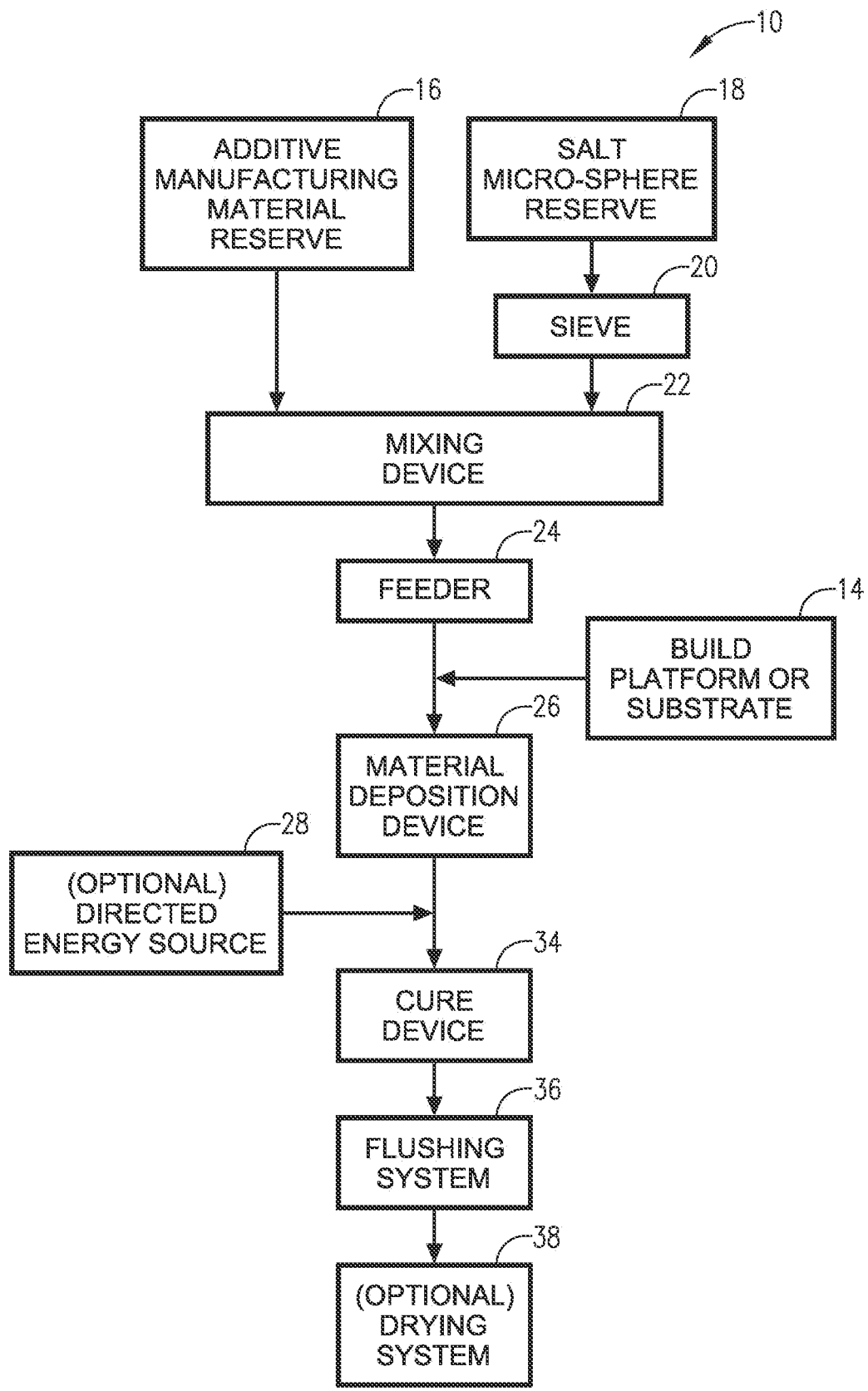
FIG. 2 is a schematic diagram of components of the additive manufacturing system of FIG. 1.
Figure 3:
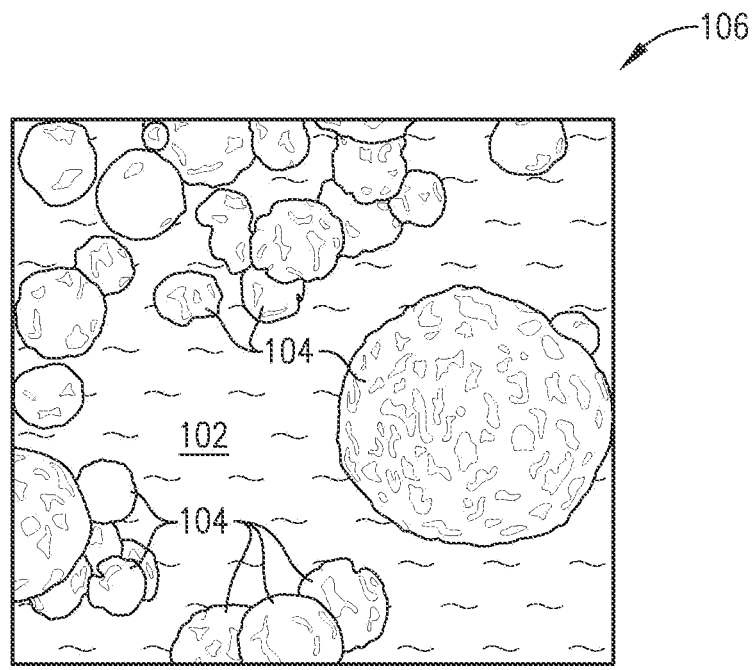
FIG. 3 is an enlarged view of an additive manufacturing material mixture including salt micro-spheres in accordance with an embodiment of the invention.
Figure 4:
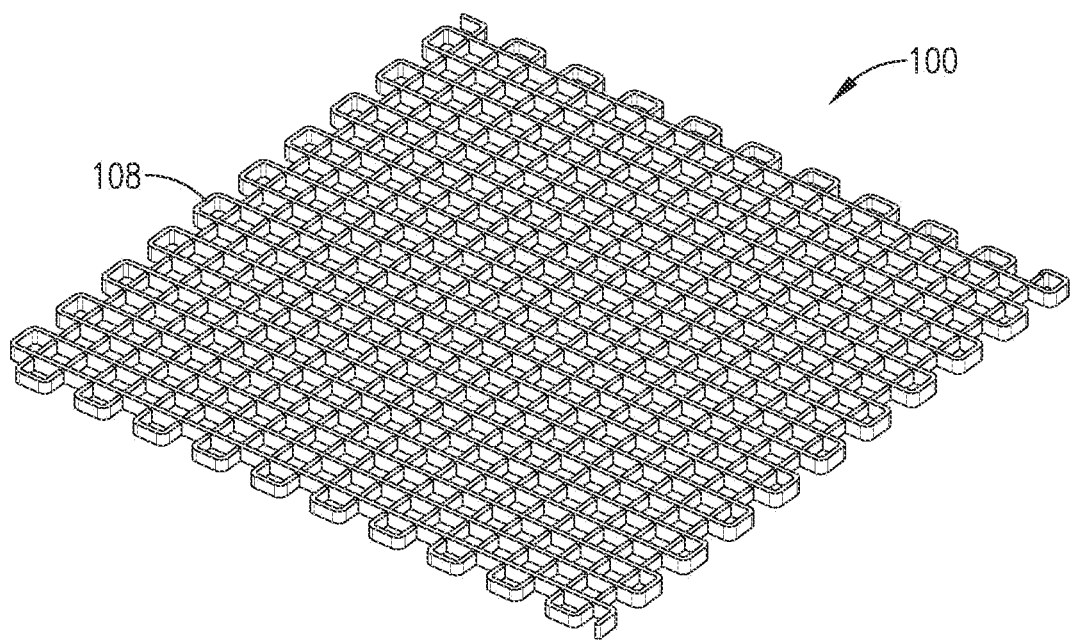
FIG. 4 is a perspective view of a part formed via the additive manufacturing material mixture of FIG. 3 in accordance with an embodiment of the invention.
Figure 5:
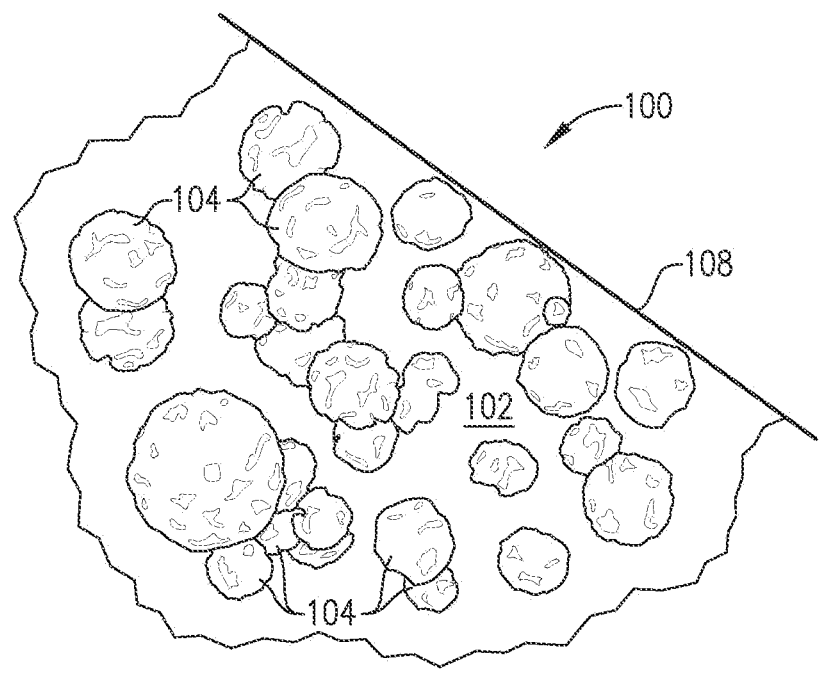
FIG. 5 is an enlarged view of the part of FIG. 4.
Figure 6:
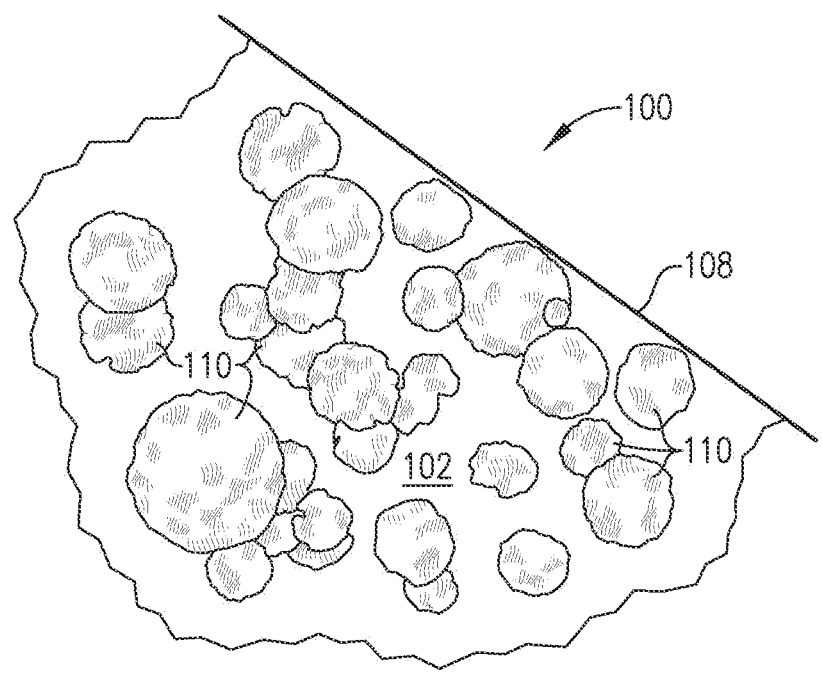
FIG. 6 is an enlarged view of the part of FIG. 4 with the salt micro-spheres removed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to the drawing figures, and particularly FIGS. 1-6, an additive manufacturing system 10 constructed in accordance with an embodiment of the present invention is illustrated. The additive manufacturing system 10 broadly comprises a frame 12, a build platform 14, an additive manufacturing material reserve 16, a salt micro-sphere reserve 18, a sieve 20, a mixing device 22, a feeder 24, a material mixture deposition device 26, an optional directed energy source 28, a set of motors 30, a processor 32, a cure device 34, a flushing system 36, and an optional drying system 38.

The frame 12 provides structure for the build platform 14, feeder 24, material mixture deposition device 26, directed energy source 28, and motors 30 and may include a base, vertical members, cross members, and mounting points for mounting the above components thereto. Alternatively, the frame 12 may be a walled housing or similar structure.

The build platform 14 supports a part 100 as it is being constructed and may be a stationary or movable flat tray or bed, a substrate, a print plate, a shaped mandrel, a wheel, scaffolding, or similar support. The build platform 14 may be integral with the additive manufacturing system 10 or may be removable and transferable with the part 100 as the part 100 is being constructed.

The additive manufacturing material reserve 16 retains additive manufacturing material 102 and may be a hopper, tank, cartridge, container, spool, or other similar material holder. The additive manufacturing material reserve 16 may be integral with the additive manufacturing system 10 or may be disposable and/or reusable.

The additive manufacturing material 102 may be a highly viscous liquid or may be in pellet or powder form or any other suitable form. The additive manufacturing material 102 may be any plastic, polymer, or organic material suitable for use in additive manufacturing. For example, the additive manufacturing material 102 may be any silicone material such as HVM/LVM rubber gum or direct-write inks of various durometers. The additive manufacturing material 102 may also be acrylonitrile butadiene styrene (ABS), polyamide, straw-based plastic, or other similar material.

The salt micro-sphere reserve 18 retains salt micro-spheres 104 and may be a hopper, tank, cartridge, container, or other similar holder. The salt micro-sphere reserve 18 may be integral with the additive manufacturing system 10 or may be disposable and/or reusable.

The salt micro-spheres 102 are small, dissolvable, spherical crystals that do not have a conventional crystalline shape. In one embodiment, the salt micro-spheres are hollow. The salt micro-spheres 102 may have diameters of between 20 micrometers and 100 micrometers.

The sieve 20 includes a filter or series of filters for sorting salt micro-spheres by size. For example, the sieve 20 may include a first filter including holes having a diameter substantially equal to the largest desired diameter of salt micro-spheres. A second filter in series with the first filter may include holes having a diameter substantially equal to the smallest desired diameter of salt micro-spheres such that salt micro-spheres that pass through the first filter but do not pass through the second filter (and hence have diameters within a desired range) can be used in the additive manufacturing system 10. In one embodiment, the salt micro-spheres 104 may be filtered to have diameters of between 20 micrometers and 100 micrometers. The sieve 20 may be used or connected upstream or downstream of the salt micro-sphere reserve 18.

The mixing device 22 is connected downstream of the additive manufacturing material reserve 16 and the salt micro-sphere reserve 18 (and optionally downstream of the sieve 20) and upstream of the feeder 24. The mixing device 22 combines, via continuous inline mixing, batch mixing, or the like, the optionally filtered salt micro-spheres with the additive manufacturing material to form a homogenous additive manufacturing material mixture 106. The mixing device 22 may be a mechanical mixer, a planetary mixer, a resonance acoustic mixer, or any other suitable mixer.

The feeder 24 is connected downstream of the mixing device 22 and directs the additive manufacturing material 102 to the material mixture deposition device 26. The feeder 24 may be a pump, an auger, or any other suitable feeder. Alternatively, the additive manufacturing material 102 may be gravity fed to the material mixture deposition device 26.

The material mixture deposition device 26 may include a nozzle, guide, sprayer, rake, or other similar component for depositing the additive manufacturing material mixture 106 onto the build platform 14 and previously constructed layers via DIW or a similar technique. In one embodiment, the material mixture deposition device 26 prints strands of additive manufacturing material mixture 106 to create a lattice structure.

The optional directed energy source 28 may be a laser, heater, or similar component for melting the additive manufacturing material 102 and bonding (e.g., sintering) the additive manufacturing material 102 to a previously constructed layer. The directed energy source 28 may be configured to melt the additive manufacturing material 102 as the additive manufacturing material mixture 106 is being deposited or melt the additive manufacturing material 102 of an entire layer after the layer of additive manufacturing material mixture 106 has been deposited.

The motors 30 position the material mixture deposition device 26 over the build platform 14 and previously constructed layers and move the material mixture deposition device 26 as the additive manufacturing material 102 is deposited onto the build platform 14 and the previously constructed layers. The motors 30 may be oriented orthogonally to each other so that a first one of the motors 30 is configured to move the material mixture deposition device 26 in a lateral "x" direction, a second one of the motors 30 is configured to move the material mixture deposition device 26 in a longitudinal "y" direction, and a third one of the motors 30 is configured to move the material mixture deposition device 26 in an altitudinal "z" direction. Alternatively, the motors 30 may move the build platform 14 (and hence the part 100) while the material mixture deposition device 26 remains stationary.

The processor 32 directs the material mixture deposition device 26 via the motors 30 and activates the material mixture deposition device 26 such that the material mixture deposition device 26 deposits the additive manufacturing material mixture 106 onto the build platform 14 and previously constructed layers according to a computer aided design of the part. The processor 32 may include a circuit board, memory, display, inputs, and/or other electronic components such as a transceiver or external connection for communicating with other external computers.

The processor 32 may implement aspects of the present invention with one or more computer programs stored in or on computer-readable medium residing on or accessible by the processor. Each computer program preferably comprises an ordered listing of executable instructions for implementing logical functions in the processor 32. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The cure device 34 may be a heating device or system for curing the part 100 after deposition is complete. The cure device 34 may be an oven, a furnace, a heating element, or any other suitable heating device. The cure device 34 heats the part 100 so as to crosslink polymers in the additive manufacturing material 102.

The flushing system 36 may be configured to dispense warm or hot water for dissolving the salt micro-spheres 104, thus leaving pores 110 in the structure 108. The flushing system 36 may be a water bath, a tank, or any other suitable device.

The optional drying system 38 may use heat, positive airflow, humidity control, or a combination thereof to dry the structure 108. Alternatively, the structure 108 may be air-dried.

The additive manufacturing system 10 may be any type of additive manufacturing or "3D printing" system such as a sintering, laser melting, laser sintering, DIW, extruding, fusing, stereolithography, light polymerizing, powder bed, wire additive, or laminated object manufacturing system. The additive manufacturing system 10 may also be a hybrid system that combines additive manufacturing with molding, scaffolding, and/or other subtractive manufacturing or assembly techniques.

Figure 7:
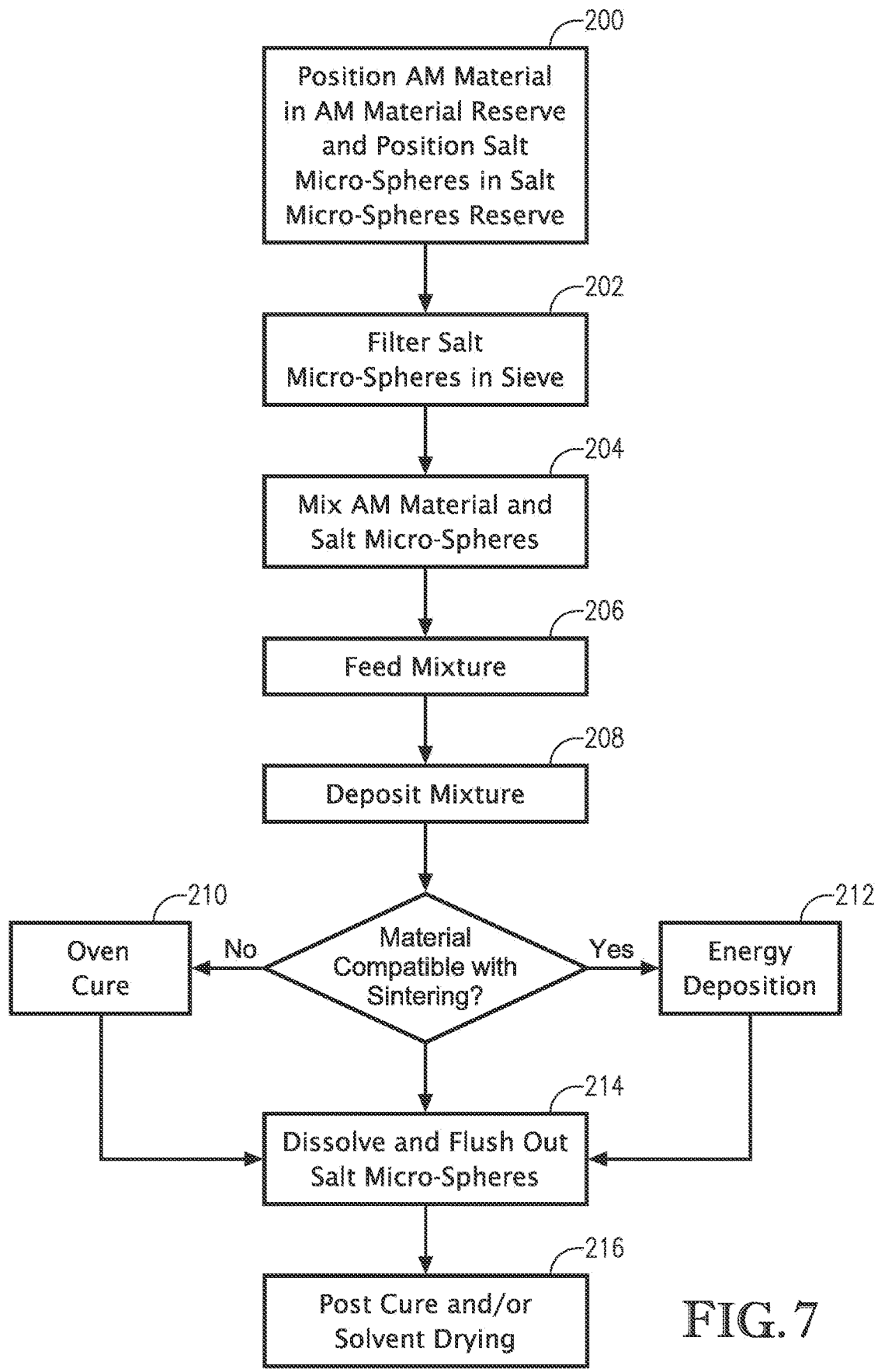
FIG. 7 is a flow diagram showing some steps of a method of forming a part via additive manufacturing in accordance with another embodiment of the invention.

Turning to FIG. 7, and with reference to FIGS. 1-6, use of the additive manufacturing system 10 will now be described in more detail. First, the additive manufacturing material 102 may be positioned in the additive manufacturing material reserve 16 and the salt micro-spheres 104 may be positioned in the salt micro-sphere reserve 18, as shown in block 200.

The salt micro-spheres 104 may then be filtered through the sieve 20 so that only salt micro-spheres having diameters within a desired range are used, as shown in block 202. Alternatively, the salt micro-spheres 104 may be pre-sieved. Depending on the part being made or the part's intended application, it may be desirable for the salt micro-spheres 104 to be unfiltered for size.

The salt micro-spheres 104 and additive manufacturing material 102 may then be mixed together via the mixing device 22 to create the additive manufacturing material mixture 106, as shown in block 204. The salt micro-spheres 104 and additive manufacturing material 102 may be mixed according to a desired ratio. In one embodiment, the ratio may be chosen such that the pores 110 created by the salt micro-spheres account for a certain amount, such as at least fifty percent, of an effective volume of the structure 108. This ratio allows the salt micro-spheres 104 to be flushable from the pores 110 and not embedded in the additive manufacturing material 102.

The additive manufacturing material mixture 106 may then be fed to the material mixture deposition device 26 via the feeder 24, as shown in block 206. The additive manufacturing material mixture 106 may be metered in discrete amounts or continuously, depending on movement and position of the material mixture deposition device 26.

The material mixture deposition device 26 may then deposit the additive manufacturing material mixture 106 onto the build platform 14 and previously constructed layers via DIW or a similar technique, as shown in block 208. The specific location and placement of the additive manufacturing material mixture 106 may be according to computer-aided design (CAD) data, or other technical model or drawing, as followed manually or by a user or as directed in an automated or semi-automated fashion via control signals provided from the processor 32 to the motors 30. In one embodiment, the additive manufacturing material mixture 106 is extruded as strands so that the resulting structure 108 is a lattice structure having several voids 112, as discussed in more detail below.

If the additive manufacturing material 102 is not compatible with sintering, the structure 108 may then be cured in the cure device 34, as shown in block 210. To that end, the cure device 34 may heat the part 100 so as to crosslink polymer chains of the additive manufacturing material 102. Alternatively, the additive manufacturing material 102 may be allowed to passively cure (e.g., at room temperature).

However, doing so consumes more time. In another embodiment, the additive manufacturing material 102 may be heat cured during processing.

If the additive manufacturing material 102 is compatible with sintering, the optional directed energy source 28 may melt or sinter the additive manufacturing material 102 of the current layer of additive manufacturing material mixture 106, as shown in block 212. This may include tracing the directed energy source 28 over or through the current layer according to CAD data, models, drawings, or other technical resources. The additive manufacturing material 102 may fuse together and to additive manufacturing material of a previous layer.

Note that any of steps 200-212 may be repeated multiple times as needed. For example, once one layer of the structure 108 has been deposited, another layer of additive manufacturing material mixture 106 may be deposited. This may be accomplished through first lowering the build platform 14 relative to the material mixture deposition device 26 and directed energy source 28.

The flushing system 36 may then dissolve the salt micro-spheres 104 and flush the resulting saline solution from the pores 110, as shown in block 214. In one embodiment, the structure 108 is submerged in warm or hot water and may be agitated to ensure complete dissolution, thus leaving the structure 108 with pores 110.

The optional drying system 38 may then dry (or post cure) the structure 108, as shown in block 216. To that end, the structure 108 may be dried via heat, positive airflow, humidity control, or a combination thereof. Alternatively, the structure 108 may be air-dried.

The above-described steps may be performed in any order, including simultaneously. In addition, some of the steps may be repeated, duplicated, and/or omitted without departing from the scope of the present invention.

The resulting structure 108 may be compressible, the extent of which will be referred to as "smash". For example, if the structure 108 is a lattice structure, the structure 108 may be compressed until all of the voids 112 are temporarily completely constricted, which is defined as a lock-up point. The structure 108 may be further compressed until all of the pores 110 are temporarily completely constricted. That is, the pores 110 provide additional smash to the structure 108, which is particularly useful for sound dampening and cushioning applications.

The above-described additive manufacturing system 10 and method provide several advantages. For example, the salt micro-spheres 104 have a melting temperature of approximately 1400 degrees Fahrenheit, which allows the additive manufacturing material 102 to be fully processed and cured prior to salt dissolution. The salt micro-spheres 104 are free-flowing and do not clump together. The salt micro-spheres 104 create spherical pores and can be filtered to create pores having diameters of a desired value or within a desired range. The spherical aspect of the salt micro-spheres 104 increase repeatability and predictability of the additive manufacturing process. The salt micro-spheres 104 can be mixed with the additive manufacturing material 102 at various ratios so that the resulting pores 110 account for a desired amount of an effective volume of the structure 108, thus allowing the salt micro-spheres to be dissolved and leached out of the pores 110. The pores 110 left from the salt micro-spheres give the structure 108 additional smash. Printing additive manufacturing material strands or other features with lots of surface area facilitates leaching the salt micro-spheres from the pores 110.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of forming a part via additive manufacturing, the method comprising the steps of:
   mixing salt micro-spheres with an additive manufacturing material to form an additive manufacturing material mixture;
   depositing the additive manufacturing material mixture onto a build platform layer-by-layer according to a computer-aided design; and
   curing the additive manufacturing material mixture so as to create a structure having pores formed by the salt micro-spheres.

2. The method of claim 1, further comprising a step of removing the salt micro-spheres from the pores of the structure.

3. The method of claim 2, wherein the step of removing the salt micro-spheres from the pores of the structure includes subjecting the salt micro-spheres to warm water.

4. The method of claim 1, further comprising a step of filtering the salt micro-spheres via a first sieve so that some of the salt micro-spheres pass through the first sieve, the step of mixing the salt micro-spheres with the additive manufacturing material including mixing the salt micro-spheres that passed through the first sieve so that the salt micro-spheres mixed with the additive manufacturing material have a maximum diameter based on the first sieve.

5. The method of claim 4, further comprising a step of filtering the salt micro-spheres via a second sieve so that some of the salt micro-spheres pass through the second sieve, the step of mixing the salt micro-spheres with the additive manufacturing material including mixing the salt micro-spheres that did not pass through the second sieve so that the salt micro-spheres mixed with the additive manufacturing material have a minimum diameter based on the second sieve.

6. The method of claim 1, wherein the step of mixing the salt micro-spheres with the additive manufacturing material is performed via a resonance acoustic mixer.

7. The method of claim 1, wherein the step of depositing the additive manufacturing material mixture includes direct ink writing (DIW).

8. The method of claim 1, wherein the step of mixing the salt micro-spheres with the additive manufacturing material includes mixing relative amounts of salt micro-spheres and additive manufacturing material so that the pores account for at least fifty percent of an effective volume of the structure.

9. The method of claim 1, wherein the step of mixing the salt micro-spheres with the additive manufacturing material includes at least one of planetary mixing and resonance acoustic mixing.

10. The method of claim 1, wherein the additive manufacturing material is cured at above 270 degrees Fahrenheit.

11. A method of forming a part via additive manufacturing, the method comprising the steps of:
   mixing hollow salt micro-spheres with an additive manufacturing material to form an additive manufacturing material mixture;
   depositing the additive manufacturing material mixture onto a build platform; and curing the additive manufacturing material mixture so as to create a structure having pores formed by the salt micro-spheres.

12. The method of claim 11, further comprising a step of removing the salt micro-spheres from the pores of the structure.

13. The method of claim 12, wherein the step of removing the salt micro-spheres from the pores of the structure includes subjecting the salt micro-spheres to warm water.

14. The method of claim 11, further comprising a step of filtering the salt micro-spheres via a first sieve so that some of the salt micro-spheres pass through the first sieve, the step of mixing the salt micro-spheres with the additive manufacturing material including mixing the salt micro-spheres that passed through the first sieve so that the salt micro-spheres mixed with the additive manufacturing material have a maximum diameter based on the first sieve.

15. The method of claim 14, further comprising a step of filtering the salt micro-spheres via a second sieve so that some of the salt micro-spheres pass through the second sieve, the step of mixing the salt micro-spheres with the additive manufacturing material including mixing the salt micro-spheres that did not pass through the second sieve so that the salt micro-spheres mixed with the additive manufacturing material have a minimum diameter based on the second sieve.

16. The method of claim 11, wherein the step of mixing the salt micro-spheres with the additive manufacturing material is performed via a resonance acoustic mixer.

17. The method of claim 11, wherein the step of depositing the additive manufacturing material mixture includes direct ink writing (DIW).

18. The method of claim 11, wherein the step of mixing the salt micro-spheres with the additive manufacturing material includes mixing relative amounts of salt micro-spheres and additive manufacturing material so that the pores account for at least fifty percent of an effective volume of the structure.

19. The method of claim 11, wherein the step of mixing the salt micro-spheres with the additive manufacturing material includes at least one of planetary mixing and resonance acoustic mixing.

20. A method of forming a part via additive manufacturing, the method comprising the steps of:
filtering hollow salt micro-spheres via two sieves so that the filtered salt micro-spheres have a diameter within a range based on the two sieves;
mixing the filtered salt micro-spheres with an additive manufacturing material to form an additive manufacturing material mixture;
depositing the additive manufacturing material mixture onto a build platform;
curing the additive manufacturing material mixture above at least 270 degrees Fahrenheit via a curing device so as to create a structure having pores formed by the filtered salt micro-spheres; and
flushing the filtered salt micro-spheres from the pores via warm water.

\* \* \* \* \*